(12) United States Patent
Kulzer

(10) Patent No.: US 11,066,979 B2
(45) Date of Patent: Jul. 20, 2021

(54) INTERNAL COMBUSTION ENGINE WITH FUEL INJECTION DIRECTION AND IGNITION DIRECTION INTERSECTING IN A COMBUSTION CHAMBER OF A CYLINDER

(71) Applicant: Dr. Ing. h.c. F. Porsche Aktiengesellschaft, Stuttgart (DE)

(72) Inventor: Andre Casal Kulzer, Boeblingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/416,322

(22) Filed: May 20, 2019

(65) Prior Publication Data

US 2019/0360385 A1    Nov. 28, 2019

(30) Foreign Application Priority Data

May 24, 2018    (DE) ..................... 10 2018 112 450.3

(51) Int. Cl.
*F02B 19/12*     (2006.01)
*F02P 15/02*     (2006.01)
*F02B 23/08*     (2006.01)

(52) U.S. Cl.
CPC .............. *F02B 19/12* (2013.01); *F02P 15/02* (2013.01); *F02B 2023/085* (2013.01)

(58) Field of Classification Search
CPC .............. F02B 19/00–18; F02B 31/085; F02B 2023/085; F02F 1/4214; F02P 15/02; F02P 15/08
USPC ........ 123/253–293, 305, 308, 309, 432, 638
See application file for complete search history.

(56) References Cited

U.S. PATENT DOCUMENTS

| 5,709,189 A | * | 1/1998 | Monnier | ................. F02B 19/12 123/260 |
| 6,325,039 B1 | * | 12/2001 | Goto | ..................... F02F 1/4214 123/275 |
| 2002/0038645 A1 | * | 4/2002 | Chmela | ..................... F02B 1/12 123/276 |
| 2007/0221164 A1 | * | 9/2007 | Ashida | ................... F02B 19/12 123/267 |

(Continued)

FOREIGN PATENT DOCUMENTS

| DE | 10 2012 202 080 | 8/2013 |
| DE | 10 2016 218 707 | 3/2018 |
| DE | 10 2017 204 806 | 9/2018 |

*Primary Examiner* — Carl C Staubach
*Assistant Examiner* — Robert A Werner
(74) *Attorney, Agent, or Firm* — Gerald E. Hespos; Michael J. Porco; Matthew T. Hespos

(57) ABSTRACT

Combustion cylinder (10) of an internal combustion engine, having a combustion chamber wall (20), which surrounds a combustion chamber (30), and a combustion chamber cover (40), which closes off the combustion chamber (30) on the upper side, wherein at least one inlet valve (50) for letting in a fluid is arranged on an inlet side (42) in the combustion chamber cover (40), and at least one outlet valve (60) for letting out a fluid is arranged on an outlet side (44) in the combustion chamber cover (40), wherein, furthermore, a prechamber spark plug (70) is arranged between the at least one inlet valve (50) and the at least one outlet valve (60) in the combustion chamber cover (40), which prechamber spark plug is arranged between the at least one inlet valve (50) and an injector (80) for injecting combustion fluid.

2 Claims, 2 Drawing Sheets

(56) References Cited

U.S. PATENT DOCUMENTS

| | | | |
|---|---|---|---|
| 2016/0160742 A1* | 6/2016 | Willi | F02M 21/0275 |
| | | | 123/260 |
| 2017/0241325 A1* | 8/2017 | Gu | F02M 43/04 |
| 2018/0128157 A1* | 5/2018 | VanDerWege | F02B 19/04 |
| 2019/0078498 A1* | 3/2019 | Bedogni | F02B 19/1019 |

* cited by examiner

INTERNAL COMBUSTION ENGINE WITH FUEL INJECTION DIRECTION AND IGNITION DIRECTION INTERSECTING IN A COMBUSTION CHAMBER OF A CYLINDER

CROSS REFERENCE TO RELATED APPLICATION

This application claims priority under 35 USC 119 to German Patent Appl. No. 10 2018 112 450.3 filed on May 24, 2018, the entire disclosure of which is incorporated herein by reference.

BACKGROUND

Field of the Invention. The invention relates to a combustion cylinder of an internal combustion engine and to a method for operating a combustion cylinder.

Related Art. Internal combustion engines have one or more combustion cylinders in which a controlled combustion takes place. This combustion requires fuel that can be introduced in gasified form or directly injected. For direct injection, combustion chamber covers are installed in combustion cylinders and have an injector. Inlet valves also are arranged to introduce the necessary combustion air or the necessary combustion gas, and outlet valves are arranged to channel corresponding exhaust gas out of the combustion chamber.

Known combustion cylinders cannot be operated optimally outside certain standard conditions. Readjustment must occur to ensure an operation that is as ideal as possible, for example by changing the injection behavior, changing the piston strokes and changing the valve switching operations. This leads to an increased complexity and an increased control effort.

An object of the invention is to overcome the above-described disadvantages. In particular, it is an object of the invention to stabilize and optimize the operation of a combustion cylinder in a cost-effective and simple manner.

Features and details that are described herein in conjunction with the combustion cylinder of the invention also apply to the method of the invention, and vice versa, so that reference always is made reciprocally with respect to the disclosure of the individual aspects of the invention.

SUMMARY

According to the invention, a combustion cylinder of an internal combustion engine has a combustion chamber wall that surrounds a combustion chamber. The upper side of the combustion chamber is closed by a combustion chamber cover. The combustion chamber cover has at least one inlet valve for letting in a fluid on an inlet side. At least one outlet valve for letting out a fluid is arranged on an outlet side of the combustion chamber cover. Furthermore, a prechamber spark plug is arranged between the at least one inlet valve and the at least one outlet valve in the combustion chamber cover. The prechamber spark plug is arranged between the at least one inlet valve and an injector for injecting fuel fluid.

A combustion cylinder according to the invention thus has, in a known manner, a combustion chamber wall that surrounds the combustion chamber. The lower end of the combustion chamber is designed to be variable through the corresponding surface of the movable piston. The movement of the piston enables the volume of the combustion chamber to be changed or the piston or be pushed out of the combustion chamber during the start of the combustion.

A central spark plug in the form of the prechamber spark plug is arranged in addition to a central injector. Operation of the prior art combustion cylinder took place either without spark plug or else with a spark plug on the inlet side, that is to say outside all of the valves next to the inlet valves. However, according to the invention, the prechamber spark plug is arranged between the inlet valve and the outlet valve. The prechamber spark plug thus is situated in a central region between the at least one inlet valve and the at least one outlet valve. Moreover, the injector for direct injection of combustion fluid also is arranged in precisely this region. This means that the injector is arranged adjacent to the prechamber spark plug. As a result, a direct mixing of gas and liquid in the region of the prechamber spark plug becomes possible. The spacings between the ignition point or the ignition location on the prechamber spark plug and the necessary ignition composition are reduced in this manner. In other words, the prechamber spark plug now is between the two inlet locations, namely on the one side, the inlet location for the fuel in the form of the injector, and on the other side, the inlet location for the necessary combustion air or the necessary combustion gas through the inlet valve. This leads to considerably improved flow conditions and accordingly to improved ignition times and ignition functions.

On the basis of the above considerations, a combustion cylinder according to the invention can be used with advantageous stability during regular operation within the scope of the characteristic map and also in the boundary region of the characteristic map or in difficult operating conditions. The combustion starts more easily or more quickly due to improved ignition functionality, and the combustion proceeds in a more stable and more defined manner. In particular, the ignition time can be correlated better with the actual start of the combustion within the combustion chamber. As a result, an undesired misfiring or an undesired retarded ignition can be avoided with a high degree of probability. A combustion cylinder according to the invention thus allows considerably increased combustion stability by virtue of the central arrangement of an injector with a prechamber spark plug.

The invention also is advantageous in terms of the installation space. In the prior art, the spark plug was arranged outside of the inlet valves, that is to say in the circumferential region of the combustion chamber cover. However, a central region that remains free of other internal equipment now can be used. Regions of the inlet side and the outlet side are unaffected by the spark plug. Therefore, either a more compact design of the entire combustion chamber becomes possible in these regions, or larger through-passage openings for the inlet valves and/or the outlet valves become possible. The central arrangement with the corresponding advantages in terms of installation space is accompanied by further advantages that lead to design freedom and is accompanied by further possibilities of optimizing the combustion due to improved inlet situations and flow conditions in the region of the inlet valves and the outlet valves. In this way, the stability of the combustion in the combustion cylinder can be improved in a direct manner by the central arrangement and in an indirect manner by the improvement of the installation space design.

It is also advantageous if, in a combustion cylinder according to the invention, the injector is arranged between the prechamber spark plug and the at least one outlet valve. Thus, the injector is situated outside the inlet side and also is in the same central region as the prechamber spark plug. This mid- or central arrangement, which is combined with the mid- or central arrangement of the prechamber spark plug, means that the advantages of the invention in terms of stabilizing combustion can be improved further. A combined ignition and injection is also possible. This can also be referred to as ignition-coupled injection. Thus, the ignition can be improved, accelerated and occur in a defined manner in terms of timing by virtue of the adjacent arrangement of these two components.

The at least one outlet valve may be arranged between the prechamber spark plug and the injector. The injector of this alternate embodiment may be arranged on the outer side and outside of the outlet valve. This leads to more structural freedom between the outlet valve and the at least one inlet valve in the central region, thereby enabling a freer positioning or the selection of a larger design of the prechamber spark plug. It also becomes conceivable in this manner that the fluid flow through the inlet valves and the fluid flow upon injection at the injector can be spaced apart from one another to such an extent that the admitted fluid flows have as little influence on one another as possible. This leads to an acceleration in the injection behavior or during the filling of the combustion chamber and to a further improved mixing. The injection can also be predefined in an independent manner and preconfigured in a simpler manner with corresponding simulation.

The outlet valve of the above-described combustion cylinder may be arranged between the prechamber spark plug and an auxiliary spark plug. The auxiliary spark plug can further improve stabilization on an outer side. This embodiment is combined with the central arrangement of the injector and the central arrangement of the prechamber spark plug. Particularly in difficult operating situations, such as during a cold start of the internal combustion engine, a heating operation of a downstream catalytic converter or during operation in a low-load situation, it is possible with the aid of the auxiliary spark plug for the ignition to be improved or to occur with a higher degree of probability even in this difficult use situation. The auxiliary spark plug may be in operation only when these difficult use situations are present. Thus, the auxiliary spark plug can be smaller, lighter and more cost-effective since it performs only an assistance function within the combustion cylinder. In other words, the auxiliary spark plug assists during ignition with the prechamber spark plug and is operated jointly with the prechamber spark plug. Thus, the ignition time of the prechamber spark plug may be correlated with the ignition time of the auxiliary spark plug and corresponds thereto.

The auxiliary spark plug, the injector and the prechamber spark plug may be arranged on a common straight line. This common straight line also may run through the center or the mid-axis of the combustion chamber cover. This common straight line may be integrated symmetrically, preferably as a bisector, into this combustion chamber cover. This central arrangement formed on a straight line leads to a further improvement in the installation space so that additional installation space becomes possible for enlarging the valve openings of the outlet valves and/or of the inlet valves. This arrangement thus allows the advantages in terms of stabilizing the combustion.

The injector may be closer to the prechamber spark plug than to the auxiliary spark plug. Thus, the prechamber spark plug and the injector can make available a central main operation in the middle central region. The auxiliary spark plug may be offset outwardly into the outer region of the outer side to be used there only in the difficult operating situations. In the main use situation and during most of the time of the operation of the internal combustion engine, the auxiliary spark plug does not perform any operation but remains passive so that the outer region has as little influence as possible on the flow situation in the combustion chamber.

The injector may have an injection direction that has a point of intersection in the combustion chamber with an ignition direction of the prechamber spark plug. This injection direction thus sprays in and injects the fuel. It can also be understood as a central injection direction that is formed as an injection axis around which a spray cone injects the fuel. The same applies to the ignition direction and the corresponding orientation of the prechamber spark plug. This intersecting orientation of the two directions means that the ignition-coupled injection can occur even more easily since the location of the ignition can also be combined. In other words, the injector and the prechamber spark plug are directed toward one another for the optimally defined ignition situation or enclose an acute angle with one another.

At least two inlet valves may be arranged on the inlet side and/or at least two outlet valves may be arranged on the outlet side symmetrically to one another. Increasing the number of valves leads to an increase in the total valve opening. Thus, during an opening stroke, a greater quantity of volumetric flow of fluid can pass into the combustion chamber through the inlet valves or out of the combustion chamber out of the outlet valves. The number of the valves means that relatively compact valves can be used to keep the installation space of the overall system small and to increase the speed of the valve opening and of the valve closing as far as possible. The large throughput per stroke is thus also possible with a high stroke speed so that this can be combined with the advantages according to the invention in terms of the stabilization of the combustion.

The present invention also relates to a method for the operation of a combustion cylinder, comprising the following steps:
   opening the at least one inlet valve for inserting fluids into the combustion chamber,
   injecting fuel by means of the injector into the combustion chamber,
   igniting the fuel in the combustion chamber by the prechamber spark plug,
   letting the fluid out of the combustion chamber through the at least one outlet valve.

A method according to the invention is thus accompanied by the same advantages as have been explained comprehensively with reference to a combustion cylinder according to the invention.

A method according to the invention can be developed in that the steps of injection and of ignition are carried out in a temporally coupled manner. This can also be described as a so-called ignition-coupled injection and further improves the optimization and the stabilization of the combustion behavior within the combustion chamber.

Further advantages, features and particulars of the invention will emerge from the following description in which exemplary embodiments of the invention are described in detail with reference to the drawings. The features mentioned in the claims and the description may be essential to the invention each individually on their own or in any desired combination.

DETAILED DESCRIPTION

Figure 1:
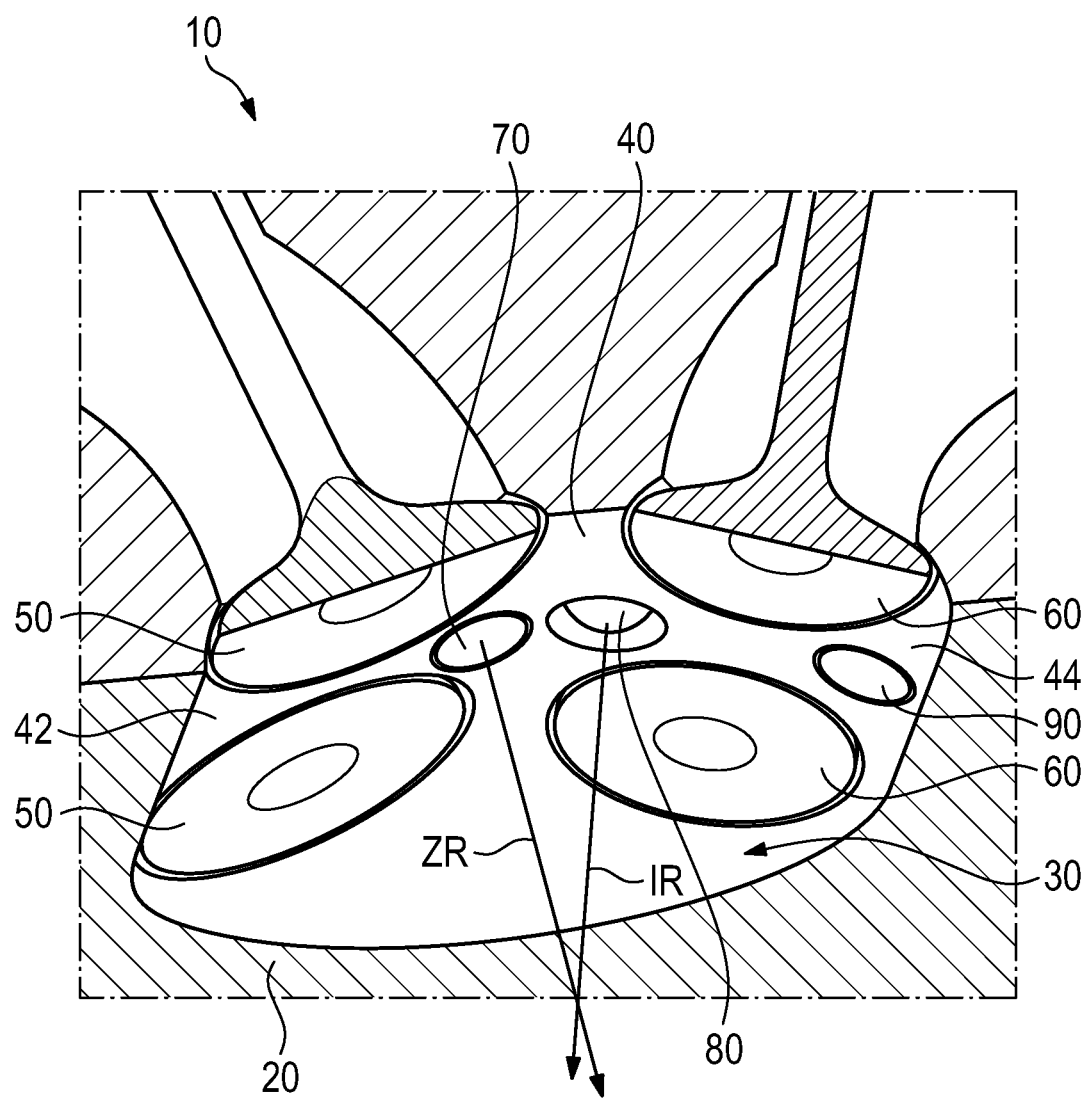
FIG. 1 shows an embodiment of a combustion cylinder according to the invention, with a view of the combustion chamber cover.
Figure 2:
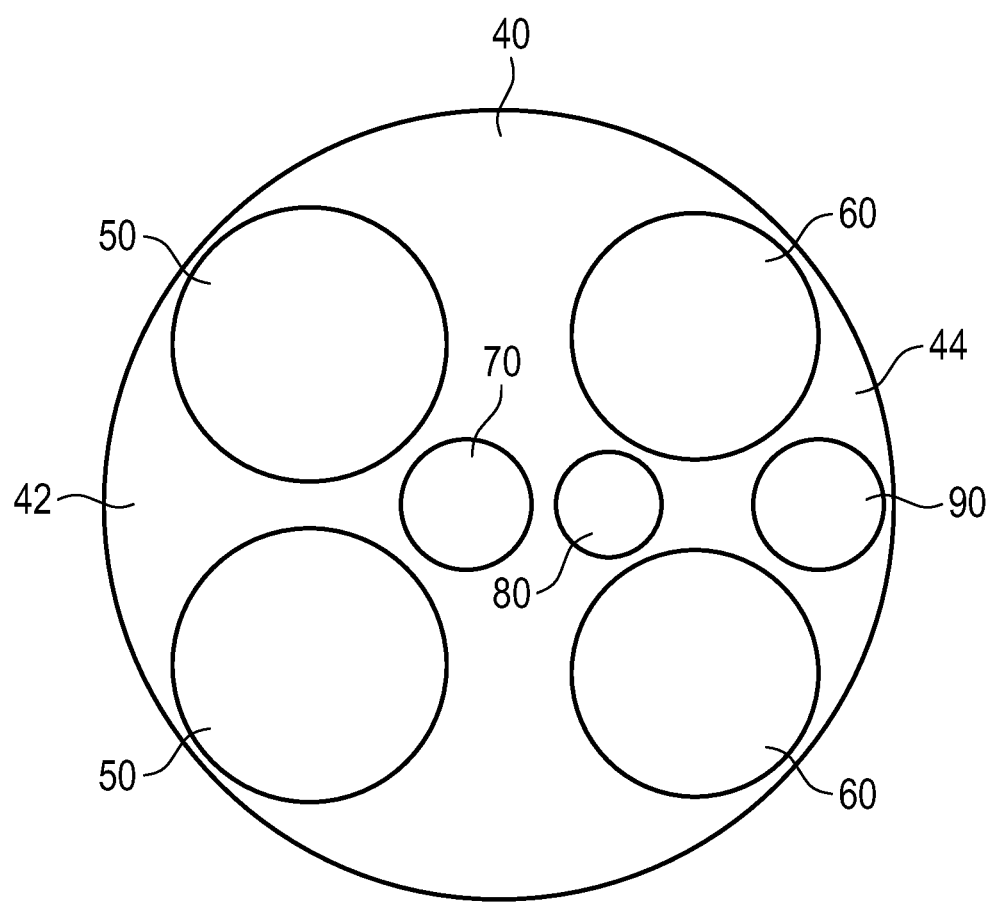
FIG. 2 is a bottom view of the combustion chamber cover of FIG. 1.

FIGS. 1 and 2 show a combustion cylinder 10 of an internal combustion engine having a corresponding combustion chamber 30. This combustion chamber 30 is surrounded by a combustion chamber wall 20 which (although not shown in further detail in FIG. 1) continues farther down cylindrically. To the bottom, and not shown either, this combustion chamber 30 is closed off by a piston which can movably vary the volume of the combustion chamber 30.

For the operation of the internal combustion engine, two inlet valves 50 are arranged on the inlet side 42 of the combustion chamber cover 40. During the start of a combustion operation, combustion air or combustion fluid is let into the combustion chamber 30 through these two inlet valves 50 in the opened state.

An injector 80 is provided to achieve a direct injection of fuel into the combustion chamber 30 in addition to the combustion air or in addition to the combustion fluid. This injector 80 is arranged in the central or mid-region between the inlet valves 50 and the outlet valves 60. If this combustion fluid is injected via the inlet valves 50 and fuel via the injector 80 during the operation of the internal combustion engine, an ignitable mixture arises within the combustion chamber 30. A prechamber spark plug 70 is arranged in the central or mid-region to make available an ignition spark and hence the starting point for the desired explosion-like combustion in the combustion chamber 30. The close proximity in the adjacent arrangement between the injector 80 and the prechamber spark plug 70 makes it possible to carry out an ignition-coupled injection herein. Thus, a precise time setting as to the time of injection and as to the time of ignition is conceivable. By virtue of the fact that the small spacing between injector 80 and prechamber spark plug 70 has only a small influence on the flow situation, the ignition time can also actually be maintained in reality here in a very precise and predefined manner. The injector 80 may have an injection direction IR that has a point of intersection in the combustion chamber with an ignition direction ZR of the prechamber spark plug 70. This injection direction IR thus sprays in and injects the fuel. It can also be understood as a central injection direction that is formed as an injection axis around which a spray cone injects the fuel. The same applies to the ignition direction ZR and the corresponding orientation of the prechamber spark plug 70. This intersecting orientation of the two directions IR and ZR means that the ignition-coupled injection can occur even more easily since the location of the ignition can also be combined. In other words, the injector 80 and the prechamber spark plug 70 are directed toward one another for the optimally defined ignition situation or enclose an acute angle with one another.

As soon as the combustion is completed, the outlet valves 60 are opened such that corresponding exhaust-gas fluid can leave the combustion chamber 30 again on the outlet side 44.

FIGS. 1 and 2 illustrate, in an optional manner an additional alternative. Thus, in this embodiment, an auxiliary spark plug 90 also is arranged on the outer side 44, that is to say outside of the outlet valves 60. The auxiliary spark plug is situated in the outer region since it is not in use, or only in use to a limited degree, during the normal operation of the combustion cylinder 10. If, however, the combustion cylinder 10 or the entire internal combustion engine is in a difficult use situation, for example in a low-load operation or in a cold start situation, this can mean that the operation or the ignition can occur with difficulty or not at all. In such operating modes, the auxiliary spark plug 90 can serve also to actually carry out the ignition in a defined manner and with a high degree of probability. In this auxiliary operation, the auxiliary spark plug 90 thus assists the normal operation of the prechamber spark plug 70.

The above explanation of the embodiments describes the present invention exclusively within the context of examples. Of course, individual features of the embodiments, where technically meaningful, can be freely combined with one another without departing from the scope of the present invention.

What is claimed is:

1. A combustion cylinder of an internal combustion engine, comprising:

a combustion chamber wall that surrounds a combustion chamber;

a combustion chamber cover that closes off the combustion chamber on an upper side;

first and second inlet valves for letting in a fluid, the first and second inlet valves being arranged on an inlet side in the combustion chamber cover and communicating directly with the combustion chamber;

first and second outlet valves for letting out a fluid, the first and second outlet valves being arranged on an outlet side in the combustion chamber cover and communicating directly with the combustion chamber;

a prechamber spark plug being arranged on a straight line extending from the inlet side of the combustion chamber cover to the outlet side of the combustion chamber cover, the line passing between the first and second inlet valves and between the first and second outlet valves in the combustion chamber cover, the prechamber spark plug communicating directly with the combustion chamber at a position closer to the inlet side than to the outlet side;

an injector that injects combustion fluid directly into the combustion chamber along an injection direction, the injector being arranged on the straight line and at a position between the prechamber spark plug and the outlet side, wherein the injection direction of the injector has a point of intersection in the combustion chamber with an ignition direction of the prechamber spark plug; and an auxiliary spark plug on the straight line and at a position between the injector and the outlet side, wherein:

the injector is at least partly between the first and second outlet valves, the injector is at least partly between the first and second outlet valves, the injector is closer to the prechamber spark plug than to the auxiliary spark plug, and the auxiliary spark plug is operable during selected engine operating conditions.

2. The combustion cylinder of claim 1, wherein the first and second inlet valves are arranged symmetrically on opposite sides of the straight line and the first and second outlet valves are arranged symmetrically on opposite sides of the straight line.

* * * * *